US008875008B2

(12) United States Patent
Yuniardi (10) Patent No.: US 8,875,008 B2
(45) Date of Patent: Oct. 28, 2014

(54) PRESENTATION PROGRESS AS CONTEXT FOR PRESENTER AND AUDIENCE

(75) Inventor: Nino Yuniardi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 97 days.

(21) Appl. No.: 12/943,936

(22) Filed: Nov. 11, 2010

(65) Prior Publication Data

US 2012/0124457 A1    May 17, 2012

(51) Int. Cl.
*G06F 17/25* (2006.01)
*G06F 17/30* (2006.01)
*G06F 17/26* (2006.01)

(52) U.S. Cl.
CPC ............... *G06F 17/30056* (2013.01)
USPC ............ 715/204; 345/473; 345/684

(58) Field of Classification Search
USPC ......................................................... 715/204
See application file for complete search history.

(56) References Cited

U.S. PATENT DOCUMENTS

| | | | | |
|---|---|---|---|---|
| 6,008,807 | A * | 12/1999 | Bretschneider et al. | 715/732 |
| 6,321,244 | B1 | 11/2001 | Liu et al. | |
| 6,396,500 | B1 * | 5/2002 | Qureshi et al. | 345/473 |
| 7,299,418 | B2 | 11/2007 | Dieberger | |
| 7,614,000 | B2 * | 11/2009 | Villaron et al. | 715/730 |
| 8,140,975 | B2 * | 3/2012 | Lemay et al. | 715/730 |
| 2003/0122863 | A1 * | 7/2003 | Dieberger et al. | 345/730 |
| 2005/0055643 | A1 * | 3/2005 | Quimby | 715/763 |
| 2006/0067578 | A1 * | 3/2006 | Fuse | 382/190 |
| 2006/0184872 | A1 * | 8/2006 | Dontcheva et al. | 715/512 |
| 2007/0118801 | A1 * | 5/2007 | Harshbarger et al. | 715/730 |
| 2007/0130177 | A1 | 6/2007 | Schneider et al. | |
| 2008/0168342 | A1 * | 7/2008 | Shur et al. | 715/229 |
| 2009/0292980 | A1 * | 11/2009 | Swineford et al. | 715/202 |
| 2010/0031152 | A1 | 2/2010 | Villaron et al. | |
| 2010/0037140 | A1 | 2/2010 | Penner et al. | |
| 2012/0023407 | A1 * | 1/2012 | Taylor | 715/731 |
| 2012/0079428 | A1 * | 3/2012 | Audet | 715/825 |

FOREIGN PATENT DOCUMENTS

CN           101821730 A           9/2010

OTHER PUBLICATIONS

Ricb, "PowerPoint on the Web: A New View of Your Presentation", Retrieved at<<http://blogs.msdn.com/b/powerpoint/archive/2009/10/11/powerpoint-on-the-web-a-new-view-of-your-presentation.aspx, Oct. 11, 2009.
Lane, Robert, "Relational Presentations : The Alternative to Traditional PowerPoint", Retrieved at<<http://www.indezine.com/articles/relationalpresentations.html>>, Feb. 21, 2009.

(Continued)

*Primary Examiner* — James J Debrow
(74) *Attorney, Agent, or Firm* — Jessica Meyers; Leonard Smith; Micky Minhas (57) ABSTRACT

A presentation tool that includes visual progression graphics which represents progress of a presentation. The presentation tool automatically creates and presents the progression graphics for viewing by the presenter and the audience. As the presentation progresses, animation can be applied to the progression graphics to track the progress through the presentation materials. An option is also provided to hide the progression graphics. The progression graphics can also be utilized to navigate across the presentation materials. Thus, the presenter can select portions of the progression graphics as a means to navigation or jump between sections of the materials.

20 Claims, 5 Drawing Sheets

(56) References Cited

OTHER PUBLICATIONS

"Differences in Use Between Impress and Power Point", Retrieved at<<http://wiki.services.openoffice.org/wiki/Documentation/OOoAuthor_User_Manual/Migration_Guide/Impress_and_PowerPoint>>, Apr. 14, 2008.

Good, "CounterPoint: Creating Jazzy Interactive Presentations", Retrieved at<<http://citeseerx.ist.psu.edu/viewdoc/download?doi=10.1.1.81.1382&rep=rep1&type=pdf>>, 2001.

"How to Use Prezi—The Zooming Presentation Tool", Retrieved at<<http://www.passyworld.com/passyPDFs/HowToPrezi.pdf>>, Retrieved date: Aug. 17, 2010.

"PowerPoint Accessibility—Alternatives to PowerPoint", Retrieved at<<http://webaim.org/techniques/powerpoint/alternatives>>, Retrieved date: Aug. 17, 2010.

"Dynamic PowerPoint", Retrieved at <<http://www.pptmagic.com/articles/dynamicppt.htm>>, Retrieved date: Aug. 17, 2010.

"Office Action Received for China Patent Application No. 201110371724.3", Mailed Date: May 27, 2014, Filed Date: Nov. 10, 2011, 12 pages.

"Response Filed for Office Action issued on May 27, 2014 in China Patent Application No. 201110371724.3", Mailed Date: Aug. 11, 2014, 10 pages.

"Office Action Received for China Patent Application No. 201110371724.3", Mailed Date: Dec. 25, 2013, Filed Date: Nov. 10, 2011, 13 pages.

"Response Filed for Office Action issued on Dec. 25, 2013 in China Patent Application No. 201110371724.3", Mailed Date: Apr. 28, 2014, 10 pages.

* cited by examiner

PRESENTATION PROGRESS AS CONTEXT FOR PRESENTER AND AUDIENCE

BACKGROUND

The user experience is a consideration frequently addressed in new software products to ensure that a positive interactive experience is provided to the user when interacting with the product. A positive user experience can improve user productivity and generally have an overall productive impact on user work experience, as well.

Similarly, providing a positive audience experience in a presenter/audience venue can be equally important to retention of the information being presented and overall use productivity. In a specific example, as the audience of a presentation, oftentimes the duration of the presentation is unknown. Moreover, the audience can lose context in the presenter material and subject matter. Thus, the audience can lose of focus.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is a presentation tool that includes visual progression graphics which represents progress of a presentation. The presentation tool automatically creates and presents the progression graphics for viewing by the presenter and the audience. As the presentation progresses, animation can be applied to the progression graphics to track the progress through the presentation materials. An option is also provided to hide the progression graphics.

The progression graphics can also be utilized to navigate across the presentation materials. Thus, the presenter can select portions of the progression graphics as a means to navigation or jump between sections of the materials.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture is a presentation tool that creates and applies an animated progression graphic to a presentation document or documents that to provide visual feedback to an audience of viewers to indicate the state of progression through documents of the presentation. The animation introduces a more compelling and engaging presentation by indicating context of the presentation to the audience. Additionally, the progression graphic can be interactive such that backward and forward navigation between documents and presentation units (of documents) is enabled by selecting a graphic entity or unit of the progression graphic. The presentation tool automatically creates the progression graphic to be viewable to the presenter and the audience; however, with an option to hide it. Accordingly, the presenter can present documents and content non-linearly, yet maintain context to the overall presentation materials.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
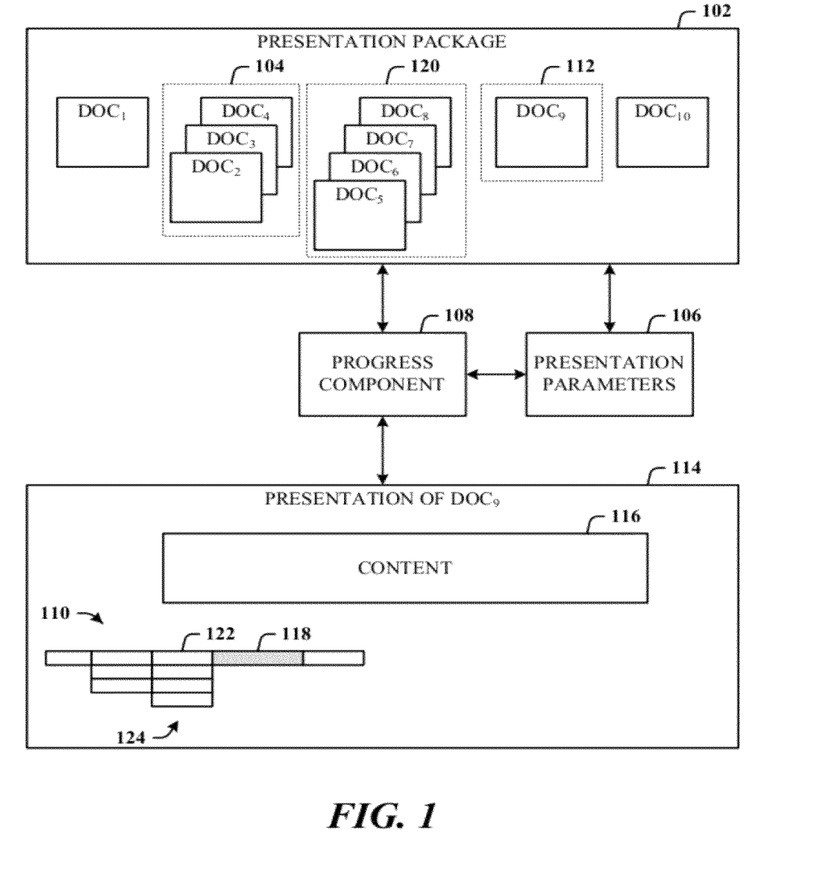
FIG. 1 illustrates a presentation system in accordance with the disclosed architecture.

FIG. 1 illustrates a presentation system 100 in accordance with the disclosed architecture. The system 100 includes a presentation package 102 (e.g., slide deck) that comprises presentation units 104 of one or more of the documents for presentation. The presentation (or presentation package) can be defined according to presentation parameters 106 such as duration (e.g., in units of time) of the presentation, duration of each presentation unit (e.g., time to present the document or documents of the unit), duration of each document of a presentation unit, and so on.

The presentation package 102 is the total presentation deck of documents and document collections (units) of a presentation application, and the parameters can include page count, presentation units within the package, type/style of graphical unit to be utilized (e.g., rectangle, square, circle, star, color, border type, font, etc.), content density (e.g., number of words or paragraphs, images, audio links, video links, document size, etc.) per document, content density per presentation unit (e.g., number documents, and total of words or paragraphs, images, audio links, video links, document size for the documents of the presentation unit), etc.

The system 100 also includes a progress component 108 that tracks and presents interactive graphics 110 which represent progression of the presentation. The graphics 110 are animated to change according to one or more of the parameters 106. The interactive graphics 110 are presented to represent parameters which include proportion of a presentation unit to the package 102, and quantity of content of a presentation unit, for example. Note that although illustrated as stacks of rectangular boxes, this is not to be construed as so limited, since the graphics 110 can comprise other geometric types (e.g., circles, triangles, etc.), numbers, alphanumeric characters, transitioning objects (e.g., from opaque to translucent to transparent, etc.), or virtually any single or combination of graphs desired that facilitate visual representation of progression through the presentation.

Here, a fourth presentation unit 112 of the package 102 includes a single ninth document ($DOC_9$) 114 that when presented includes content 116 and the graphic 110. The graphic 110 shows a grayed block 118 that directly correlates to the ninth of ten documents in the package 102. Thus, the viewer can readily discern that progress of the presentation is nearly over (second to last document of the presentation). Note also that the length of the block 118 is longer than some other blocks in the graphic 110, which indicates that more time will be expended discussing this document ($DOC_9$).

However, also note that the width of the block 118 is equivalent to the other blocks, which can be configured to indicate that the amount of content 116 is similar to the amount of content of the other blocks. It is within contemplation of the disclosed architecture that if the amount of content 116 is greater than the content of the other blocks, the block 118 can be presented larger in width (fatter) to provide direct visual correlation to the increased content amount. Other types of graphical emphasis can be employed as well to indicate other characteristics of the ninth document 114, such as greater line thickness of the block 118 to indicate an associated link to other information, for example. In order to provide continuous visual perception of the progression, the interactive graphics can be presented all of the documents of the presentation, or perhaps, introduced on intermediate and later documents other than the first or second documents.

As illustrated, the graphics 110 can depict differentiated graphical units, which here are separate and distinct rectangles. However, the differentiated graphical units can simply be two blocks side-by side, overlayed concentric circles of different radii, numbers, emoticons, etc., the point being to make the graphical units separately identifiable and understandable to the viewer as animation on the units indicates progress of the presentation. The differentiated graphical units are mapped (correlate) to the documents and presentation units included in the package 102.

The differentiated graphical unit is sized in direct correlation to the proportion of the associated presentation unit to the package 102. The differentiated graphical unit is sized in direct correlation to duration of the associated presentation unit relative to duration of the package 102 (as indicated with respect to the length of block 118).

The progress component 108 enables the graphics 110 to be made interactive such that navigation to a presentation unit of the package 102 is in response to selection of the associated differentiated graphical unit. In other words, if the presenter selects (clicks on) the block 118, for example, the presentation will immediately show the ninth document ($DOC_9$). The progress component 108 enables navigation to a document of a presentation unit in response to selection of the associated differentiated graphical unit. In other words, if the presenter selects a third presentation unit 120 (e.g., by clicking on the top block 122 of the third stack 124), navigation can be from the current document being presented to the first document ($DOC_8$) of the associated third presentation unit 120. The quantity of content of a presentation unit is represented by the interactive graphics 110 as correspondingly differentiated graphical units. Rather than indicating one block per one document, the blocks can be utilized to represent the amount of content in a presentation unit. Thus, in the example, embodiment, the quantity (or amount) of content of the third presentation unit 120 is greater than the quantity of content of the other presentation units. The interactive graphics can include a link to other content that is retrievable for viewing. For example, selecting the block 118 not only provides navigation to the ninth document, but also notifies the presenter that other information is retrievable for presentation, personal (presenter only) or public (to the audience).

Put another way, the presentation system 100 comprises the presentation package 102 that includes presentation units of one or more of the documents for presentation, the presentation defined according to presentation parameters, and the progress component that presents interactive graphics on one or more of the documents which represent progression of the presentation. The interactive graphics comprise differentiated graphical units that correlate to the documents and presentation units included in the package. The interactive graphics are animated to change according to one or more of the parameters. The interactive graphics are created and presented to represent parameters which include proportion of a presentation unit to the package, point of progress of the presentation, and amount of content of a presentation unit; and The differentiated graphical unit is sized in direct correlation to the proportion of the associated presentation unit to the package and sized in direct correlation to duration of the associated presentation unit relative to duration of the package. The progress component enables navigation to a presentation unit of the package in response to selection of the associated differentiated graphical unit and navigation to a document of the presentation unit in response to selection of the associated differentiated graphical unit. The point of progress of the presentation is represented by the interactive graphics with additional emphasis on a corresponding differentiated graphical unit. The document of particular interest in the presentation is represented by the interactive graphics with additional emphasis on a corresponding differentiated graphical unit.

Figure 2:
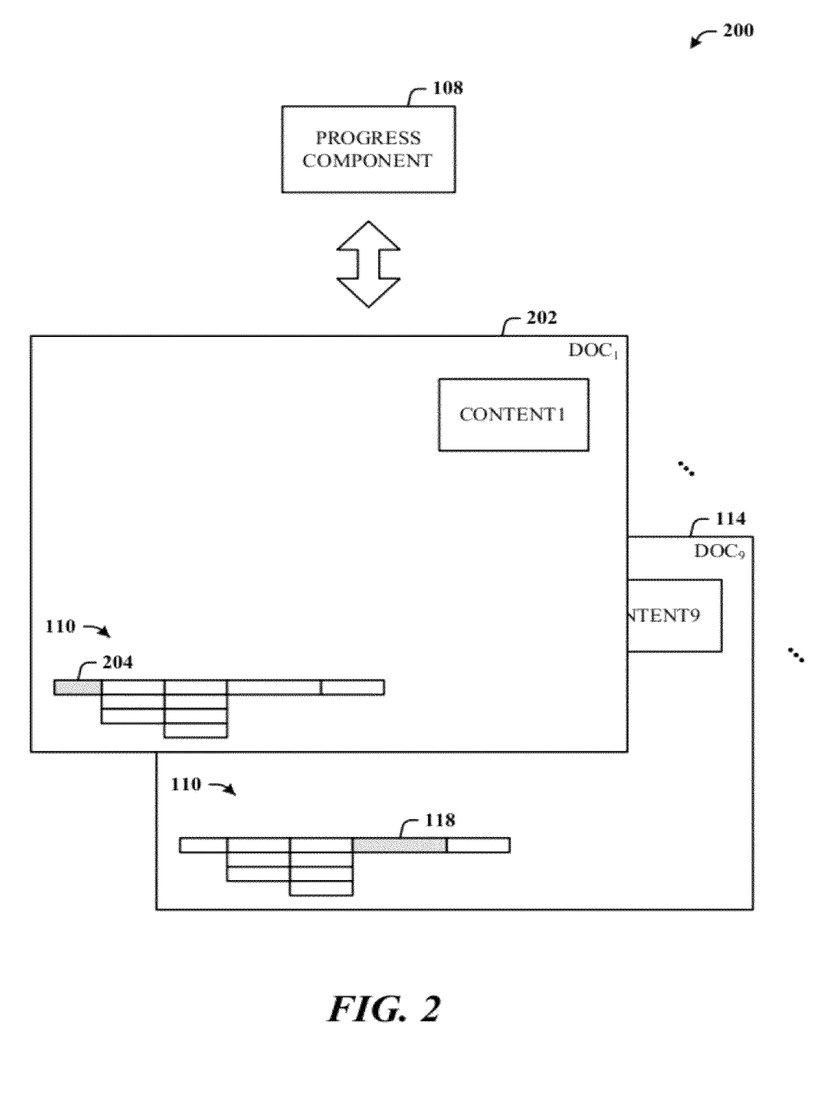
FIG. 2 illustrates a presentation system that tracks and presents presentation progression in accordance with the disclosed architecture.

FIG. 2 illustrates a presentation system 200 that tracks and presents presentation progression in accordance with the disclosed architecture. Here, a first document 202 includes the interactive graphics 110, which shows that the first document 202 is currently being viewed. The length of the associated graphical unit 204 is relatively shorter than the other blocks, indicating that discussion will be shorter for this document 202 than the other documents. The ninth document 114 includes the interactive graphics 110, which shows that the ninth document 114 is currently being viewed. The length of the associated graphical unit (e.g., block 118) is relatively longer than the other blocks, indicating that more time will be expended for discussion of this document 114 than the other documents.

The presentation parameters can be defined and input to the progress component 108 based on a trial run of the presentation. For example, if the trial run indicates the presentation will take two minutes for the introduction (a single document of a first presentation unit), ten minutes for a second presentation unit of three documents, ten minutes for a third presentation unit of four documents, twenty minutes for a fourth presentation unit of one document, and three minutes for a fifth presentation unit of one document, these parameters can be input to animate the progression graphics during the presentation.

In an automated embodiment, once the page count for the package is known, and the duration of the presentation (e.g., one hour), the progress component 108 can compute the time per page such that the presentation is progressed in a linear fashion. Other parameters such as documents per presentation unit can further provide the animated desired. In yet another feature, documents can be tagged with metadata such as time per document, and grouping for the document. Thereafter, the progress component 108 can scan the metadata for all documents to configure the progression graphics 110.

A parameter can also be the importance of a document and content. Thus, a document considered important can have a related graphical unit that is emphasized differently (e.g., longer and/or wider, different color, etc.) to indicate greater importance than other documents.

In yet another embodiment, the presenter can be shown one type of progression graphics on the present computer while the audience is shown another type on the presentation display.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
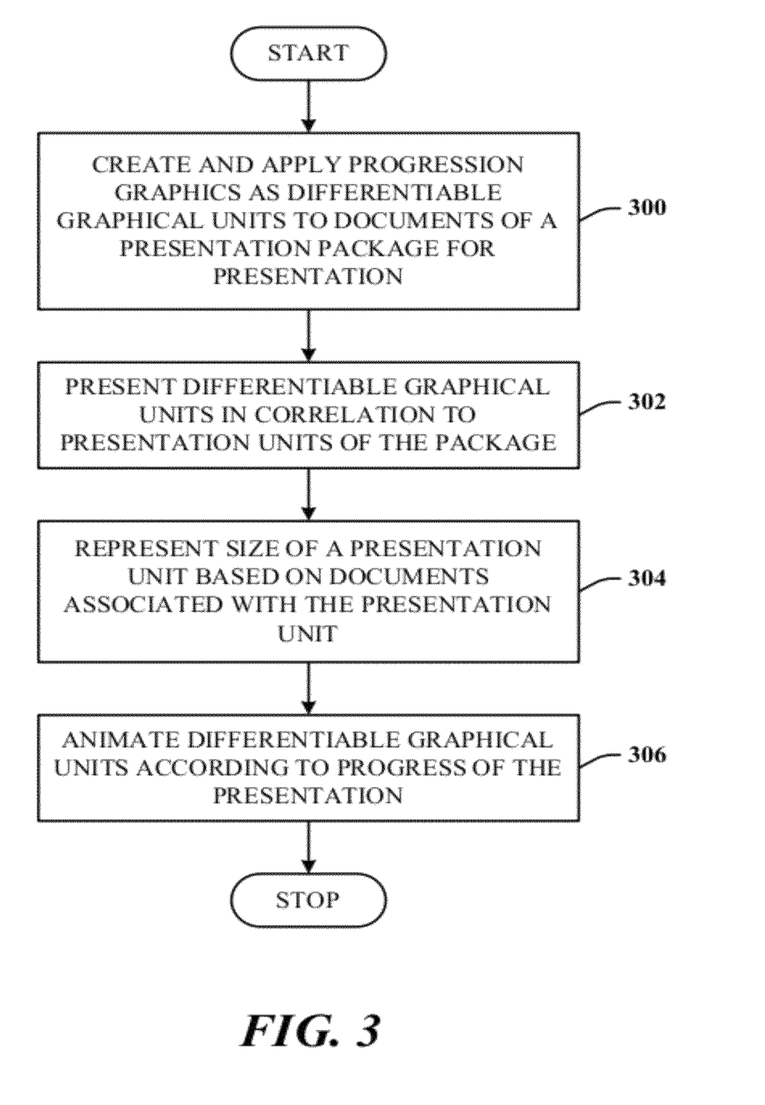
FIG. 3 illustrates a computer-implemented presentation method in accordance with the disclosed architecture.

FIG. 3 illustrates a computer-implemented presentation method in accordance with the disclosed architecture. At 300, progression graphics are created and applied as differentiable graphical units (e.g., rectangles, circles, numbers, etc.) to documents of a presentation package (e.g., slide deck) for presentation. At 302, the differentiable graphical units are presented in correlation to presentation units (e.g., groups of documents or a single document) of the package. In other words, a single graphical unit is presented for a presentation unit that is only a single document, and multiple graphical units are presented for a presentation unit that includes multiple documents. At 304, size (the number of graphical units) of a presentation unit is represented based on documents associated with the presentation unit. At 306, the differentiable graphical units are animated according to progress of the presentation.

In other words, as the presentation progresses, a presentation unit can be emphasized (e.g., highlighted, bolded, colored, enlarged, reduced, etc.), for example, to represent that the presentation unit is currently being presented. In an alternative embodiment, the individual differentiable graphical unit or units of a presentation unit are animated as presentation progresses through the document or documents. For example, if a presentation unit comprises five documents, and presentation is of the third document, the associated third differentiable graphical unit can be emphasized to show progress in the presentation unit. Alternatively, both the presentation unit and the individual graphical units of the presentation unit can be animated as progress moves through the presentation unit.

Figure 4:
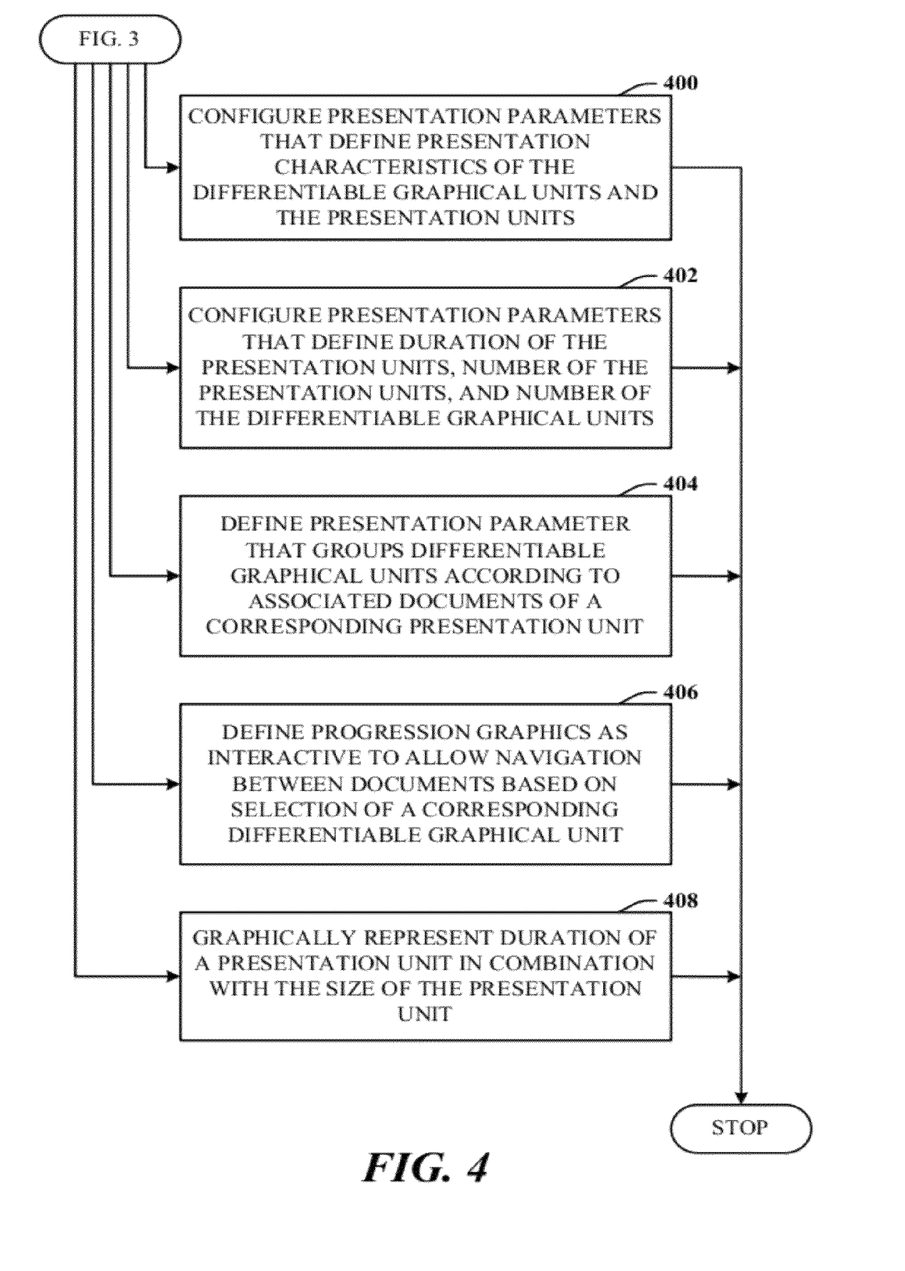
FIG. 4 illustrates further aspects of the method of FIG. 3.

FIG. 4 illustrates further aspects of the method of FIG. 3. Note that the arrowing indicates that each block represents a step that can be included, separately or in combination with other blocks, as additional aspects of the method represented by the flow chart of FIG. 3. At 400, presentation parameters (e.g., time duration and number of graphical units, duration of the presentation, emphasis to be applied, links to be associated, audio to be played, video to be played, alerts/notifications to be presented for exceeding a predefined unit duration, etc.) are configured that define presentation characteristics of the differentiable graphical units and the presentation units. At 402, presentation parameters are configured that define duration of the presentation units, number of the presentation units, and number of the differentiable graphical units. At 404, a presentation parameter is defined that groups (stacks or clusters) differentiable graphical units according to associated documents of a corresponding presentation unit. At 406, the progression graphics are defined as interactive to allow navigation between documents based on selection of a corresponding differentiable graphical unit. At 408, duration of a presentation unit is represented graphically in combination with the size of the presentation unit.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 5:
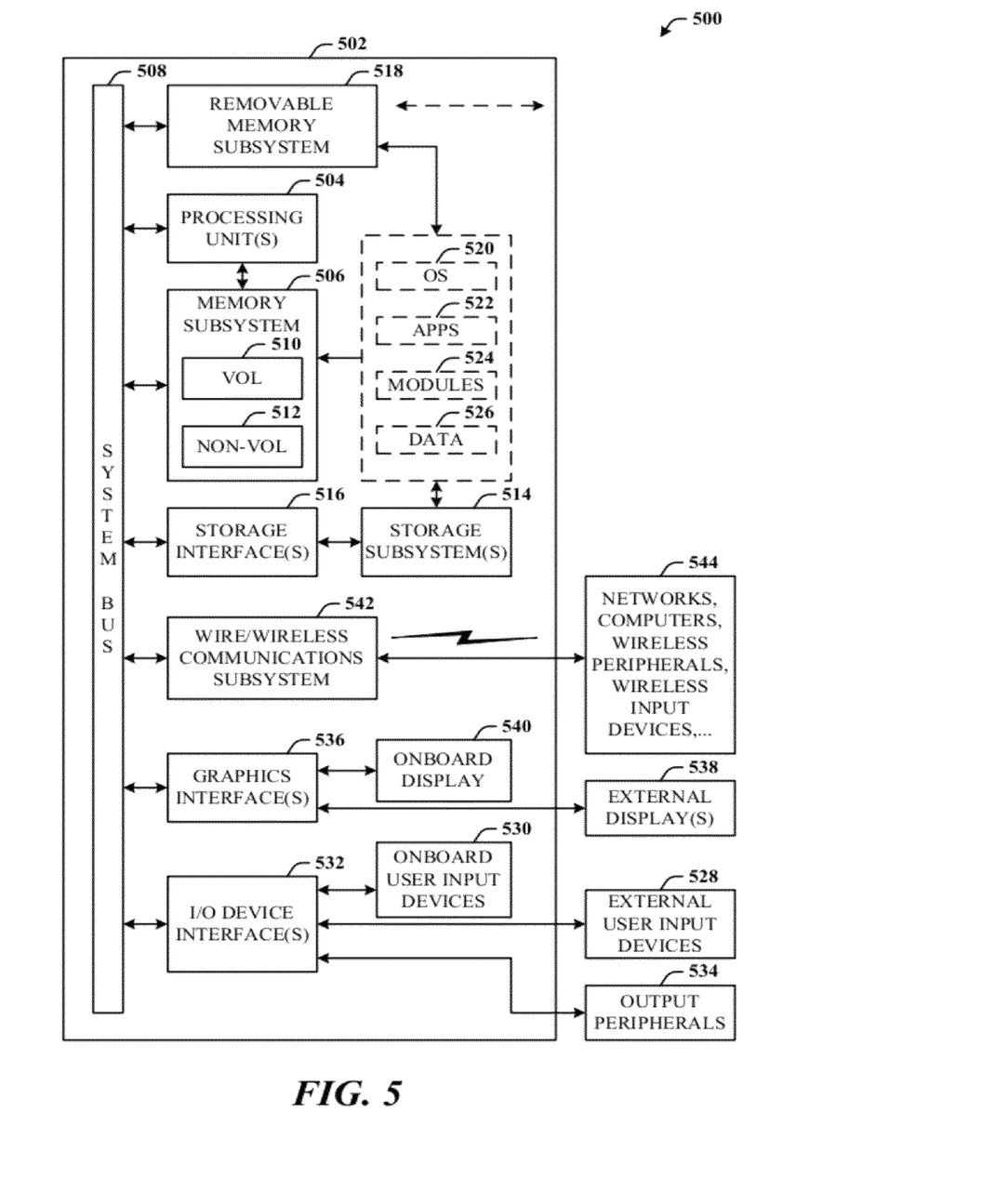
FIG. 5 illustrates a block diagram of a computing system that executes graphical presentation progression in accordance with the disclosed architecture.

Referring now to FIG. 5, there is illustrated a block diagram of a computing system 500 that executes graphical presentation progression in accordance with the disclosed architecture. In order to provide additional context for various aspects thereof, FIG. 5 and the following description are intended to provide a brief, general description of the suitable computing system 500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 500 for implementing various aspects includes the computer 502 having processing unit(s) 504, a computer-readable storage such as a system memory 506, and a system bus 508. The processing unit(s) 504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 506 can include computer-readable storage (physical storage media) such as a volatile (VOL) memory 510 (e.g., random access memory (RAM)) and non-volatile memory (NON-VOL) 512 (e.g., ROM, EPROM, EEPROM, etc.). A basic input/output system (BIOS) can be stored in the non-volatile memory 512, and includes the basic routines that facilitate the communication of data and signals between components within the computer 502, such as during startup. The volatile memory 510 can also include a high-speed RAM such as static RAM for caching data.

The system bus 508 provides an interface for system components including, but not limited to, the system memory 506 to the processing unit(s) 504. The system bus 508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 502 further includes machine readable storage subsystem(s) 514 and storage interface(s) 516 for interfacing the storage subsystem(s) 514 to the system bus 508 and other desired computer components. The storage subsystem(s) 514 (physical storage media) can include one or more of a hard disk drive (HDD), a magnetic floppy disk drive (FDD), and/or optical disk storage drive (e.g., a CD-ROM drive DVD drive), for example. The storage interface(s) 516 can include interface technologies such as EIDE, ATA, SATA, and IEEE 1394, for example.

One or more programs and data can be stored in the memory subsystem 506, a machine readable and removable memory subsystem 518 (e.g., flash drive form factor technology), and/or the storage subsystem(s) 514 (e.g., optical, magnetic, solid state), including an operating system 520, one or more application programs 522, other program modules 524, and program data 526.

The one or more application programs 522, other program modules 524, and program data 526 can include the entities and components of the system 100 of FIG. 1, the entities and components of the system 200 of FIG. 2, and the methods represented by the flowcharts of FIGS. 3 and 4, for example.

Generally, programs include routines, methods, data structures, other software components, etc., that perform particular tasks or implement particular abstract data types. All or portions of the operating system 520, applications 522, modules 524, and/or data 526 can also be cached in memory such as the volatile memory 510, for example. It is to be appreciated that the disclosed architecture can be implemented with various commercially available operating systems or combinations of operating systems (e.g., as virtual machines).

The storage subsystem(s) 514 and memory subsystems (506 and 518) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 502 and includes volatile and non-volatile internal and/or external media that is removable or non-removable. For the computer 502, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 502, programs, and data using external user input devices 528 such as a keyboard and a mouse. Other external user input devices 528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 502, programs, and data using onboard user input devices 530 such a touchpad, microphone, keyboard, etc., where the computer 502 is a portable computer, for example. These and other input devices are connected to the processing unit(s) 504 through input/output (I/O) device interface(s) 532 via the system bus 508, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 532 also facilitate the use of output peripherals 534 such as printers, audio devices, camera devices, and so on, such as a sound card and/or onboard audio processing capability.

One or more graphics interface(s) 536 (also commonly referred to as a graphics processing unit (GPU)) provide graphics and video signals between the computer 502 and external display(s) 538 (e.g., LCD, plasma) and/or onboard displays 540 (e.g., for portable computer). The graphics interface(s) 536 can also be manufactured as part of the computer system board.

The computer 502 can operate in a networked environment (e.g., IP-based) using logical connections via a wired/wireless communications subsystem 542 to one or more networks and/or other computers. The other computers can include workstations, servers, routers, personal computers, microprocessor-based entertainment appliances, peer devices or other common network nodes, and typically include many or all of the elements described relative to the computer 502. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 502 connects to the network via a wired/wireless communication subsystem 542 (e.g., a network interface adapter, onboard transceiver subsystem, etc.) to communicate with wired/wireless networks, wired/wireless printers, wired/wireless input devices 544, and so on. The computer 502 can include a modem or other means for establishing communications over the network. In a networked environment, programs and data relative to the computer 502 can be stored in the remote memory/storage device, as is associated with a distributed system. It will be appreciated that the network connections shown are exemplary and other means of establishing a communications link between the computers can be used.

The computer 502 is operable to communicate with wired/wireless devices or entities using the radio technologies such as the IEEE 802.xx family of standards, such as wireless devices operatively disposed in wireless communication (e.g., IEEE802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented presentation system, comprising:
   a presentation package for viewing as a presentation by a presenter and an audience that comprises a plurality of presentation units including clusters of documents for presentation, such that a quantity of documents of a respective cluster of a presentation unit can be different than a quantity of documents of a respective cluster of other presentation units, the presentation defined according to presentation parameters that represent properties of the presentation units with respect to the presentation package;
   a progress component configured to enable creation and application of interactive graphics to each of the documents of the presentation being viewed by the presenter and the audience, as part of the presentation, the interactive graphics represent a grouping of the clusters of the presentation units with respect to the presentation package, to indicate progression of the presentation, the graphics animated to change to indicate a currently viewed document within the grouping of the clusters of the presentation units, as navigation of the presentation progresses, according to one or more of the parameters which include proportion of a presentation unit to the package and quantity of content of a presentation unit; and
   a processor that executes computer-executable instructions associated with at least the progress component.

2. The system of claim 1, wherein the interactive graphics are presented on one or more of the documents.

3. The system of claim 1, wherein the interactive graphics comprise differentiated graphical units that correlate to the documents and presentation units included in the package.

4. The system of claim 3, wherein a differentiated graphical unit is sized in direct correlation to the proportion of the associated presentation unit to the package.

5. The system of claim 3, wherein a differentiated graphical unit is sized in direct correlation to duration of the associated presentation unit relative to duration of the package.

6. The system of claim 3, wherein the progress component enables navigation to a presentation unit of the package in response to selection of the associated differentiated graphical unit.

7. The system of claim 3, wherein the progress component enables navigation to a document of a presentation unit in response to selection of the associated differentiated graphical unit.

8. The system of claim 1, wherein the quantity of content of a presentation unit is represented by the interactive graphics as correspondingly differentiated graphical units.

9. The system of claim 1, wherein the interactive graphics include a link to other content that is retrievable for viewing.

10. A computer-implemented presentation system, comprising:
    a presentation package to be viewed as a presentation by a presenter and an audience that comprises presentation units that include clusters of documents for presentation, the presentation defined according to presentation parameters that represent properties of the presentation units with respect to the presentation package;
    a progress component that presents interactive graphics on each of the documents of the presentation being viewed by the presenter and the audience, as part of the presentation, which represent progression of the presentation, the interactive graphics comprise differentiated graphical units that correlate to the clusters of documents and presentation units included in the package, the interactive graphics represent a grouping of the clusters of the presentation units with respect to the presentation package and are animated to change to indicate a currently viewed document within a respective cluster, as navigation of the presentation progresses, according to one or more of the parameters, the interactive graphics created and presented to represent parameters which include proportion of a presentation unit to the package, point of progress of the presentation, and amount of content of a presentation unit; and
    a processor that executes computer-executable instructions associated with at least the progress component.

11. The system of claim 10, wherein the differentiated graphical unit is sized in direct correlation to the proportion of the associated presentation unit to the package and sized in direct correlation to duration of the associated presentation unit relative to duration of the package.

12. The system of claim 10, wherein the progress component enables navigation to a presentation unit of the package in response to selection of the associated differentiated graphical unit and navigation to a document of the presentation unit in response to selection of the associated differentiated graphical unit.

13. The system of claim 10, wherein the point of progress of the presentation is represented by the interactive graphics with additional emphasis on a corresponding differentiated graphical unit.

14. The system of claim 10, wherein the document of particular interest in the presentation is represented by the interactive graphics with additional emphasis on a corresponding differentiated graphical unit.

15. A presentation method performed by a computer system executing machine-readable instructions, the method comprising acts of:
    creating and applying interactive progression graphics as differentiable graphical units to clusters of documents of a presentation package as part of a presentation to be viewed by a presenter and an audience, the interactive progression graphics represent a grouping of the clusters of presentation units with respect to the presentation package;
    presenting the differentiable graphical units in each document of the cluster in correlation to the presentation units of the package to be viewed by a presenter and an audience, wherein the differentiable graphical units presented as part of the interactive progression graphics represent sizes of the presentation units in numbers of documents such that a quantity of documents of each presentation unit can be same or different than a quantity of documents of another presentation unit; and
    animating the differentiable graphical units to indicate a currently viewed document within a respective cluster, according to progress of the presentation.

16. The method of claim 15, further comprising configuring presentation parameters that define presentation characteristics of the differentiable graphical units and the presentation units.

17. The method of claim 15, further comprising configuring presentation parameters that define duration of the presentation units, number of the presentation units, and number of the differentiable graphical units.

18. The method of claim 15, further comprising defining a presentation parameter that groups differentiable graphical units according to associated documents of a corresponding presentation unit.

19. The method of claim 15, further comprising defining the progression graphics as interactive to allow navigation between documents based on selection of a corresponding differentiable graphical unit.

20. The method of claim 15, further comprising graphically representing duration of a presentation unit in combination with the size of the presentation unit.

* * * * *